(12) United States Patent
Bjernetun et al.

(10) Patent No.: US 10,077,049 B2
(45) Date of Patent: Sep. 18, 2018

(54) METHOD AND ARRANGEMENT FOR ADAPTING THE STARTING GEAR OF A VEHICLE

(71) Applicant: VOLVO TRUCK CORPORATION, Göteborg (SE)

(72) Inventors: Johan Bjernetun, Mölnlycke (SE); Anders Eriksson, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 29 days.

(21) Appl. No.: 15/023,195

(22) PCT Filed: Oct. 2, 2013

(86) PCT No.: PCT/EP2013/002951
§ 371 (c)(1),
(2) Date: Mar. 18, 2016

(87) PCT Pub. No.: WO2015/048980
PCT Pub. Date: Apr. 9, 2015

(65) Prior Publication Data
US 2016/0229400 A1     Aug. 11, 2016

(51) Int. Cl.
*B60W 30/14* (2006.01)
*B60W 30/17* (2012.01)
(Continued)

(52) U.S. Cl.
CPC ............ *B60W 30/14* (2013.01); *B60W 10/02* (2013.01); *B60W 10/11* (2013.01); *B60W 30/17* (2013.01);
(Continued)

(58) Field of Classification Search
CPC ...... B60W 30/14; B60W 10/11; B60W 30/17; B60W 30/16; B60W 2550/30;
(Continued)

(56) References Cited

U.S. PATENT DOCUMENTS

2004/0025617 A1   2/2004   Fowler et al.
2006/0279137 A1   12/2006  Steen et al.
(Continued)

FOREIGN PATENT DOCUMENTS

CN      100398352 C    7/2008
CN      101952621 A    1/2011
(Continued)

OTHER PUBLICATIONS

English translation of WO2008/028821A1; www.translationportal.epo.org; Oct. 12, 2017.*
(Continued)

*Primary Examiner* — Roger L Pang
(74) *Attorney, Agent, or Firm* — WRB-IP LLP

(57) ABSTRACT

A method is provided for adapting the starting gear of an automated manual transmission in a heavy vehicle, where a pre-selected starting gear is selected by a transmission control unit depending on vehicle parameters of the heavy vehicle, where the starting gear is lowered from the pre-selected starting gear depending on a movement behavior of a vehicle in front of the heavy vehicle. The pre-selected starting gear can be adapted to the traffic in front of the vehicle, which makes it possible to avoid unnecessary gear changes and which allows for a smooth starting cycle of the vehicle.

13 Claims, 3 Drawing Sheets

(51) Int. Cl.
  *F16H 61/02* (2006.01)
  *B60W 10/02* (2006.01)
  *B60W 10/11* (2012.01)
  *B60W 30/16* (2012.01)

(52) U.S. Cl.
  CPC ......... *F16H 61/0213* (2013.01); *B60W 30/16* (2013.01); *B60W 2420/52* (2013.01); *B60W 2550/30* (2013.01); *B60W 2710/021* (2013.01); *B60W 2710/1005* (2013.01); *B60Y 2200/142* (2013.01); *F16H 2061/023* (2013.01); *F16H 2061/0218* (2013.01)

(58) Field of Classification Search
  CPC ....... B60W 2710/1005; B60W 2420/52; F16H 61/0213; F16H 2061/0218; F16H 2061/023
  USPC .............................................. 701/60, 61, 65
  See application file for complete search history.

(56) References Cited

U.S. PATENT DOCUMENTS

| | | |
|---|---|---|
| 2009/0192686 A1 | 7/2009 | Niehsen et al. |
| 2009/0299598 A1 | 12/2009 | Boecker et al. |
| 2011/0010060 A1 | 1/2011 | Karlsson |
| 2011/0144871 A1 | 6/2011 | Eriksson et al. |
| 2012/0296534 A1 | 11/2012 | Juhlin-Dannfelt et al. |
| 2014/0309897 A1* | 10/2014 | Ly .................. B60W 30/18054 701/58 |
| 2017/0122430 A1* | 5/2017 | Jerger ................. F16H 61/0213 |

FOREIGN PATENT DOCUMENTS

| | | |
|---|---|---|
| CN | 102114837 A | 7/2011 |
| CN | 102132075 A | 7/2011 |
| CN | 102205845 A | 10/2011 |
| DE | 10 2007 009829 A1 | 9/2008 |
| JP | H02212231 | 8/1990 |
| JP | 2005106164 | 4/2005 |
| JP | 2005308179 A | 4/2005 |
| JP | 2012111321 | 6/2012 |
| JP | 2013151993 | 8/2013 |
| WO | 2008028821 A1 | 3/2008 |

OTHER PUBLICATIONS

Japanese Official Action (dated Apr. 21, 2017) (translation) for corresponding Japanese App. 2016-519821.
Chinese Office Action (dated Apr. 27, 2017) for corresponding Chinese App. 201380080062.1.
International Search Report (dated Jun. 12, 2014) for corresponding International App. PCT/EP2013/002951.
Japanese Official Action (dated Jan. 9, 2018) (translation) for corresponding Japanese App. 2016-519821.

* cited by examiner

METHOD AND ARRANGEMENT FOR ADAPTING THE STARTING GEAR OF A VEHICLE

BACKGROUND AND SUMMARY

The present invention relates to a method and arrangement for adapting the starting gear of a heavy vehicle having an automated manual transmission. The invention further relates to a computer program adapted to perform such a method when said program is run on a computer, and a computer program product comprising such program code means stored on a computer readable medium. The method is advantageous for vehicles travelling in long queues or heavy traffic with several stops and starts.

Modern vehicles are often provided with a cruise control system in order to improve the comfort of a driver. Some cruise control system are provided with further functions, such as an adaptive control system that uses distance measuring equipment to monitor the distance to a vehicle in front of the own vehicle, in order to be able to adapt the cruise speed to the speed of the vehicle in front. Such a system will improve the safety of the cruise control system since a minimum distance or a minimum time interval will be maintained to the vehicle in front. Some systems will also brake the vehicle if the minimum distance or the minimum time interval is not maintained, or if the distance to the vehicle in front decreases at a certain rate. The cruise control system may be adapted to maintain a set speed by using only the propulsion torque from an engine, or by also using the brakes of the vehicle. This is especially common in heavy vehicles which are equipped with auxiliary brakes, such as engine brakes and retarders. A further function of the cruise control system of the vehicle may be an economy drive setting, in which the regulating parameters of the cruise control system are ruled by economy. The distance or time interval to a vehicle in front may be measured in different ways, but a radar device is often used.

Many heavy vehicles are also provided with an automated manual transmission (AMT), which is a manual transmission provided with one or two clutches which are engaged and disengaged automatically. In this way, an automated gear change is provided without the need to use a regular automatic transmission having a torque converter. By using an AMT, the weight and complexity of the transmission is reduced, and reduced fuel consumption is also possible. An adaptive cruise control may also give input to the control unit of the AMT such that the cruise control can use also the transmission to maintain the set cruise speed.

In a vehicle having an AMT, the start gear is selected automatically even though it is possible for the driver to select a specific start gear. The control system detects vehicle parameters such as load of the vehicle, type of engine, engine performance, inclination, selected driving mode, etc and pre-selects a suitable starting gear. The starting gear is normally selected as high as possible in order to improve the comfort for the driver and to reduce the number of gear changes.

There are however occasion where such a behaviour can be improved. There is thus a need for an improved method and arrangement for adapting the starting gear of a heavy vehicle.

It is desirable to provide an improved method for adapting the starting gear of an automated manual transmission in a heavy vehicle. It is also desirable to provide an improved arrangement for adapting the starting gear of an automated manual transmission in a heavy vehicle.

In a method for adapting the starting gear of an automated manual transmission in a heavy vehicle, where a pre-selected starting gear is selected by a control unit depending on vehicle parameters of the heavy vehicle, the starting gear is lowered from the pre-selected starting gear in dependency on a movement behaviour of a vehicle in front of the heavy vehicle.

With an aspect of the inventive method, the starting gear of an automated manual transmission in a heavy vehicle can be adapted to the current traffic situation. Normally, the starting gear is determined and set by a control unit of the vehicle. The starting gear is normally selected depending on different vehicle parameters, such as total weight of the vehicle, the load, the trailer configuration, engine performance etc. The starting gear is selected such that, with the given vehicle parameters, the vehicle will be able to perform a proper start cycle without too much clutch slippage.

The inventive method is, according to an aspect thereof, especially useful when the vehicle is standing in a queue. The adaptation of the starting gear is done by lowering the starting gear from a pre-selected starting gear in dependency of the movement behaviour of the vehicle in front. In this way, a starting gear can be selected such that the vehicle will reach the estimated speed of the vehicle in front with the starting gear, when the clutch is fully engaged. The starting gear is lowered by one or more gears. The advantage of lowering the starting gear is that the clutch will be fully engaged when the starting cycle is completed. By adapting the starting gear to the movement behaviour of the vehicle in front, the starting gear can be used also when the vehicle continue to travel in the queue, such that an unnecessary shift down must not be made after the start cycle, or such that unnecessary clutch slippage is avoided.

The adapted starting gear is preferably selected depending on the type of movement behaviour of the vehicle in front. If the movement behaviour of the vehicle in front is an acceleration, the rate of acceleration is used to determine if and how much the starting gear is to be lowered in order to be able to perform a proper start cycle. If the movement behaviour of the vehicle in front is a substantially constant speed, the selected starting gear is selected such that the own vehicle will reach a speed that corresponds to the vehicle in front when the start cycle is completed. On the other hand, if the movement behaviour of the vehicle in front is such that it is determined that the pre-selected starting gear is the best choice, an adaptation of the starting gear is not made. This may e.g. be the case if the vehicle in front accelerates with a relatively high rate or if the distance to the vehicle in front is relatively long.

The determination of when to adapt the starting gear by selecting a lower starting gear, and by how much the starting gear is lowered, is preferably governed by predetermined threshold values based on the movement behaviour of the vehicle in front.

In an arrangement for adapting the starting gear of an automated manual transmission in a heavy vehicle, where the arrangement comprises a control unit adapted to pre-select a starting gear depending on vehicle parameters of the heavy vehicle, the problem is solved in that the arrangement comprises means for detecting a movement behaviour of a vehicle in front of the heavy vehicle, and that the control unit is adapted to lower the starting gear from the pre-selected starting gear depending on the detected movement behaviour of the vehicle in front.

By this first embodiment of the arrangement for adapting the starting gear of an automated manual transmission in a heavy vehicle, the arrangement comprises a control unit adapted to pre-select a starting gear depending on vehicle parameters of the heavy vehicle and means for detecting movement behaviour of a vehicle in front of the heavy vehicle. The control unit is adapted to lower the starting gear from the pre-selected starting gear depending on the detected movement behaviour of the vehicle in front. The control unit may e.g. be a transmission control unit which preferably interacts with an adaptive cruise control unit, or may be integrated in the adaptive cruise control unit. The control unit may also be a stand-alone control unit or it may be integrated in any suitable control unit. The means for detecting movement behaviour of a vehicle in front is preferably a radar, even though other technical solutions such as image detection, a laser scanner or a radio transmission between the vehicle in front and the vehicle behind in order to send information about the movement behavior, are also possible solutions.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims. The method and arrangement is especially suitable for heavy vehicles such as trucks and busses.

Figure 1:
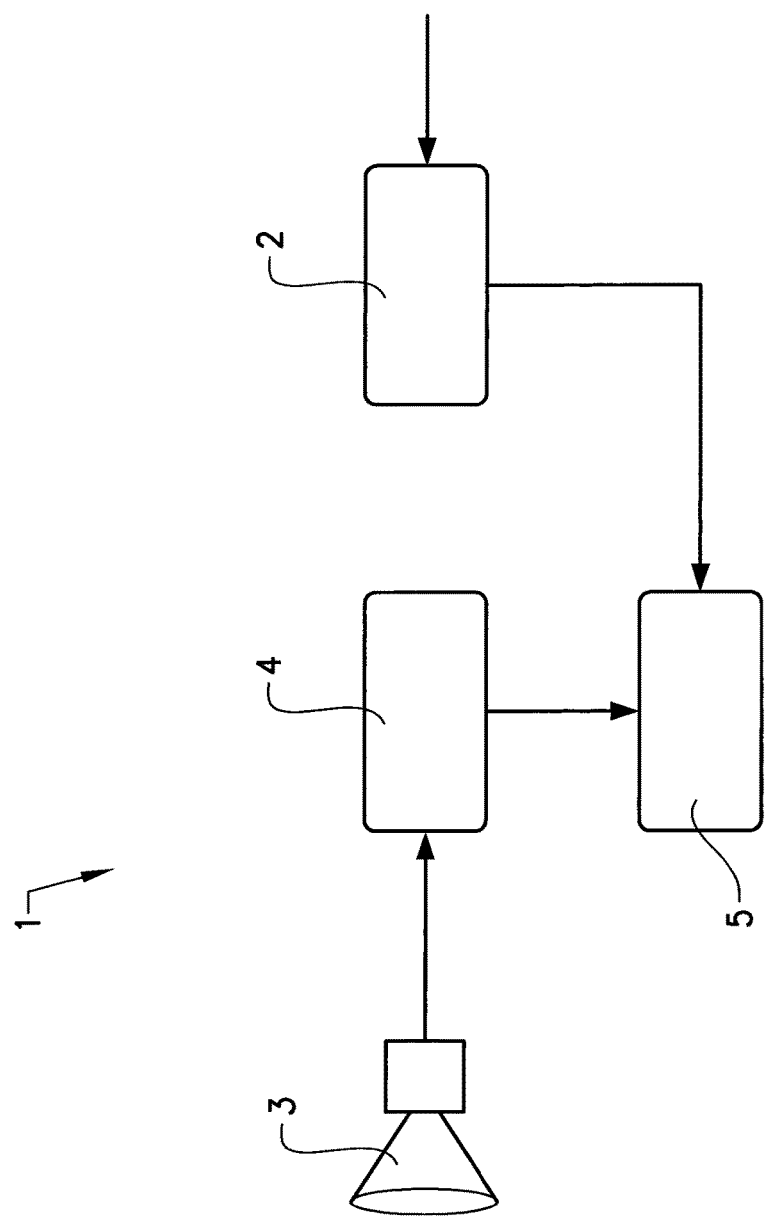
FIG. 1 shows a schematic view of an arrangement for adapting the starting gear of an automated manual transmission in a heavy vehicle according to the invention.
Figure 2:
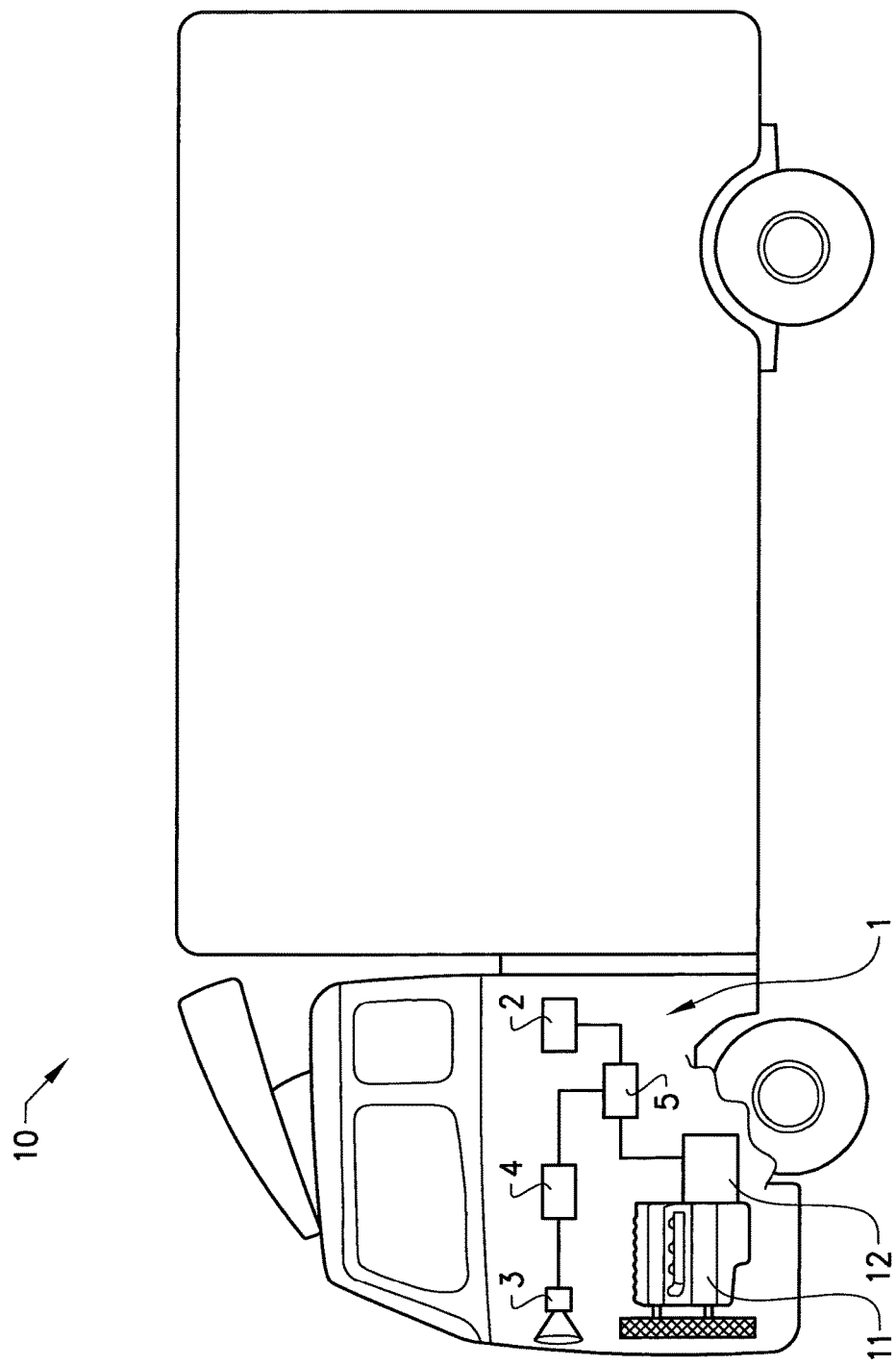
FIG. 2 shows a vehicle comprising such an arrangement.

FIG. 1 shows a schematic arrangement for adapting the starting gear of an automated manual transmission in a heavy vehicle, and FIG. 2 shows a vehicle comprising such an arrangement. The vehicle 10 comprises an engine 11, a transmission 12, a transmission control unit 5 and an arrangement 1. The arrangement 1 comprises a vehicle control unit 2 which may be a standalone control unit or may be integrated e.g. as a software module in another electronic control unit in the vehicle. The vehicle control unit 2 is adapted to collect and forward information regarding vehicle parameters to the transmission control unit 5. The transmission control unit 5 is adapted to further receive information regarding the movement behaviour of the vehicle in front and to use this information to pre-select a starting gear for the vehicle.

The arrangement 1 further comprises an adaptive cruise control electronic control unit 4 which may be either a standalone control unit comprising the adaptive cruise control system or may also be integrated e.g. as a software module in another electronic control unit in the vehicle. The vehicle control unit 2 and the adaptive cruise control unit 4 are here described as two separate units but they may be combined in a single unit or may both be integrated in another control unit. The arrangement 1 further comprises distance means 3 for detecting a movement behaviour of a vehicle in front of the heavy vehicle. The distance means for detecting movement behaviour of a vehicle in front is preferably a radar, even though as mentioned above other technical solutions are also possible.

The transmission control unit 5 receives information from e.g. the vehicle control unit 2 regarding various vehicle parameters. The vehicle control unit forwards the information that is relevant for the determination of a starting gear that is to be used when the vehicle starts to the transmission control unit 5. Such vehicle parameters are e.g. total weight of the vehicle, the load of the vehicle, the trailer configuration, type of engine etc. Further parameters that may influence the determination of a starting gear are e.g. road inclination, ambient weather etc. The starting gear is selected by the transmission control unit 5 such that the highest possible starting gear is used for the given vehicle parameters, and for the given available energy. In this way, the vehicle will be able to perform a proper start cycle without too much clutch slippage.

For a typical start cycle, the amount that the accelerator pedal is pressed down, i.e. the ordered start energy, is also measured. If the accelerator pedal is pressed down by a relatively high amount, a regular start cycle will be selected, in which the clutch is fully engaged. If the driver presses the accelerator pedal only by a small amount, the clutch will not be engaged fully, and the vehicle will move slowly by using clutch slippage. This type of start is used when the vehicle should move small distances, e.g. when marshalling, and is not used for normal driving.

The adaptive cruise control unit 4 is connected to a distance means 3 for detecting movement behaviour of a vehicle in front. This distance means is normally used by the adaptive cruise control unit to control the distance or time gap to a vehicle in front when cruising on a highway. At still stand, before a start cycle is commenced, the distance means is used to detect movement behaviour of a vehicle in front.

If the detected movement behaviour of a vehicle in front is such that the starting gear must not be adapted, the pre-selected starting gear will be used for the start cycle. Such a case may be e.g. when there is no vehicle in front, if the distance to the vehicle in front is longer than a predefined distance or if the vehicle in front is accelerating at a high rate. In this case, the pre-selected starting gear will be used for the start cycle.

The pre-selected starting gear is in this example determined by the transmission control unit 5. The decision to lower the starting gear may in one example be determined by the transmission control unit 5 based on the movement behaviour information of the vehicle in front received from the adaptive cruise control unit 4. The decision to lower the starting gear may in another example be determined by the adaptive cruise control unit 4 based on the movement behaviour information of the vehicle in front, after which a request for lowering the starting gear is sent to the transmission control unit 5.

If there is a vehicle in front, the nature of the movement behaviour is analyzed. The movement behaviour may be either an acceleration, a constant speed or a retardation. If the movement behaviour is a constant speed, which is common when driving in a queue, the speed that the vehicle will reach by using the pre-selected starting gear, i.e. the pre-selected starting gear speed, is determined and is compared with a threshold value derived from the movement behaviour of the vehicle in front. In this case, the threshold value may e.g. be the speed of the vehicle in front or a speed slightly higher than the speed of the vehicle in front. If the movement behaviour is an acceleration, the amount of acceleration is used to determine a threshold value. If the movement behaviour is a retardation, a start cycle is probably aborted.

If the speed that will be reached with the pre-selected starting gear is higher than the threshold value, the starting gear will be lowered by e.g. one gear and the speed that will be reached by using this gear is determined. This new speed value is compared to the threshold value and if the new speed value is lower than the threshold value, the lowered starting gear is selected. This starting gear value is used by the transmission control unit as the new starting gear.

If the new speed value is still higher than the threshold value, the starting gear will be lowered by another gear and a new comparison will be performed. This will continue until a starting gear that will give a speed value below the threshold value is found. It is also possible to use a predetermined map comprising speed values, starting gears and vehicle parameters to determine a suitable starting gear.

The invention is especially useful when the vehicle is standing in a queue. The adaptation of the starting gear is done by lowering the starting gear from a pre-selected starting gear in dependency of the movement behaviour of the vehicle in front. In this way, a starting gear can be selected such that the vehicle will reach the estimated speed of the vehicle in front with the selected starting gear when the clutch is fully engaged.

For a vehicle with a weight of 25 tons and having a 500 hp engine, a normal starting gear would be gear 4 or 5. The lowest possible speed of the vehicle for a given gear can be estimated from the fact that the idle rotational speed of the engine is approximately 600 rpm. Thus, if the speed of the vehicle at this idle rotational speed is higher than the determined threshold value, a lower starting gear will be used. Preferably, a somewhat higher engine speed is used to determine the speed at a given gear, since it is unpractical to run at the idle speed of the vehicle. Preferably, a lowest engine speed of approximately 800 rpm is used, which gives a suitable speed margin. It is thus of advantage to use a starting gear that will give a speed that corresponds to the speed of the queue at a relatively low engine speed.

Figure 3:
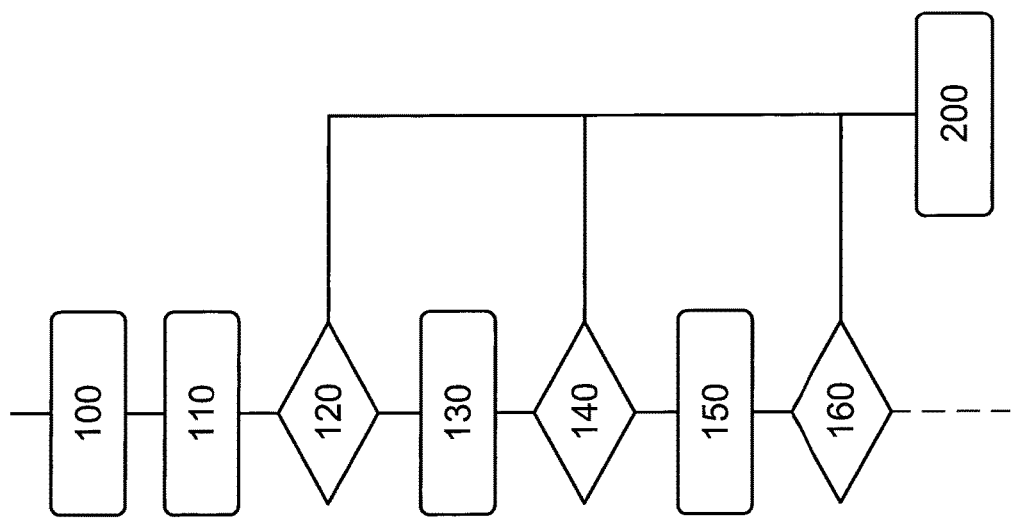
FIG. 3 shows a schematic flow chart of an inventive method for adapting the starting gear of an automated manual transmission in a heavy vehicle according to the invention.

FIG. 3 shows a schematic flow chart of a method for adapting the starting gear of an automated manual transmission in a heavy vehicle according to the invention. The method is performed by the arrangement comprising a control unit and means for detecting a movement behaviour of a vehicle in front of the heavy vehicle.

In step 100, the vehicle is halted and is standing still. The drive selector is in drive mode and the clutch of the automated manual transmission is disengaged such that there is no driving connection between the engine and the gear box of the vehicle. The transmission control unit receives information from other vehicle control units 2 regarding different vehicle parameters that will influence the start cycle of the vehicle, and may also receive information regarding ambient conditions. A pre-selected starting gear is determined from this information by the transmission control unit 5. In this example, gear 5 will be the pre-selected starting gear.

In step 110, the transmission control unit receives information regarding the movement behaviour of the vehicle in front. The information is in this example obtained from a radar mounted in the front of the vehicle and forwarded to the transmission control unit from the adaptive cruise control unit. The signals obtained from the radar are used by the adaptive cruise control unit to determine the movement behaviour of the vehicle in front. The movement behaviour of the vehicle in front may also be determined directly in the radar unit or in another control unit. It is also possible to let the adaptive cruise control unit or another control unit determine if the starting gear needs to be adapted. In this case, the speed estimations is performed by the adaptive cruise control unit or the other control unit, and a request to lower the starting gear is sent to the transmission control unit when required.

In step 120, the speed that the vehicle will reach when the start cycle is completed with the pre-selected starting gear is compared with a threshold value, which may be an estimated speed of the vehicle ahead. If the start cycle speed is lower than the threshold value, the pre-selected starting gear will be used as starting gear in step 200. If the start cycle speed is higher than the threshold value, the starting gear will have to be adapted.

In step 130, the starting gear is lowered by one gear, e.g. from gear 5 to gear 4. A control unit estimates the speed that the vehicle will reach with the new gear, i.e. gear 4, when the start cycle is completed. This speed is compared with the threshold value in step 140. If the start cycle speed is lower than the threshold value, this starting gear will be used as starting gear in step 200. If the start cycle speed is still higher than the threshold value, the starting gear will have to be further adapted.

In step 150, the starting gear is lowered by one more gear, e.g. from gear 4 to gear 3. A control unit estimates the speed that the vehicle will reach with the new gear, i.e. gear 3, when the start cycle is completed. This speed is compared with the threshold value in step 160. If the start cycle speed is lower than the threshold value, this starting gear will be used as starting gear in step 200. If the start cycle speed is still higher than the threshold value, the starting gear will be further adapted in similar methods steps until gear 1 is reached and there is no lower gear to select. Most probably, a starting gear of at least 3 will normally be selected since lower gears are mostly used in extreme situations. However, should the queue move very slowly, gear 1 may have to be used as starting gear.

When a suitable starting gear is selected, the start cycle is performed in step 200. When the start cycle is successfully completed, the vehicle can continue driving in the queue without having to make another gear change. Should the speed of the queue increase, the transmission will shift up in a normal way. Should the speed decrease somewhat, the vehicle will continue to drive with the selected gear until the speed of the engine drops to a shift down level.

The invention is not to be regarded as being limited to the embodiments described above, a number of additional variants and modifications being possible within the scope of the subsequent patent claims.

REFERENCE SIGNS

1: Arrangement for adapting starting gear
2: Vehicle control unit
3: Distance means
4: Adaptive cruise control unit
5: Transmission control unit
10: Vehicle
11: Engine
12: Transmission

The invention claimed is:

1. Method for adapting a starting gear of an automated manual transmission in a heavy vehicle, where a pre-selected starting gear is selected by a control unit depending on vehicle parameters of the heavy vehicle, wherein the starting gear is lowered from the pre-selected starting gear by the control unit depending on a movement behaviour of a vehicle in front of the heavy vehicle, wherein the movement behaviour of the vehicle in front is an acceleration.

2. Method according to claim 1, wherein the movement behaviour of the vehicle in front is a constant speed.

3. Method according to claim 1, wherein the pre-selected starting gear is lowered by one gear when a speed that the vehicle will reach with the pre-selected starting gear is above a predetermined threshold value.

4. Method according to claim 3, wherein the preselected starting gear is lowered by two gears when the speed that the vehicle will reach with a starting gear lowered by one gear is above the predetermined threshold value.

5. Method according to claim 1, wherein the adapted starting gear is selected such that a clutch of the transmission will be fully engaged when the vehicle has reached a speed corresponding to an estimated speed of the vehicle in front.

6. A computer comprising program code for performing all the steps of claim 1 when the program is run on the computer.

7. A tangible computer program product comprising program code stored on a non-transitory computer readable medium for performing all the steps of claim 1 when the program product is run on a computer.

8. Arrangement for adapting a starting gear of an automated manual transmission in a heavy vehicle, where the arrangement comprises a transmission control unit configured to pre-select a starting gear depending on vehicle parameters of the heavy vehicle, wherein the arrangement comprises a detector which detects movement behaviour of a vehicle in front of the heavy vehicle, and the transmission control unit is configured to lower the starting gear from the pre-selected starting gear depending on the detected movement behaviour of the vehicle in front, wherein the movement behaviour of the vehicle in front is an acceleration.

9. Arrangement according to claim 8, wherein the detector is a radar.

10. Arrangement according to claim 8, wherein the movement behaviour of the vehicle in from is a constant speed.

11. Arrangement according to claim 8, wherein the transmission control unit is configured to lower the pre-selected starting gear by one gear when a speed that the vehicle will reach with the pre-selected starting gear is above a predetermined threshold value.

12. Arrangement according to claim 11, wherein the transmission control unit is configured to lower the pre-selected starting gear by two gears when the speed that the vehicle will reach with, a starting gear lowered by one gear is above the predetermined threshold value.

13. Vehicle, comprising an arrangement according to claim 8.

* * * * *